June 17, 1930.  C. J. HUG  1,765,232
TRUCK BODY
Filed June 6, 1929  2 Sheets-Sheet 1

INVENTOR:
CHRISTIAN J. HUG.
BY James L. Hopkins,
ATTORNEY.

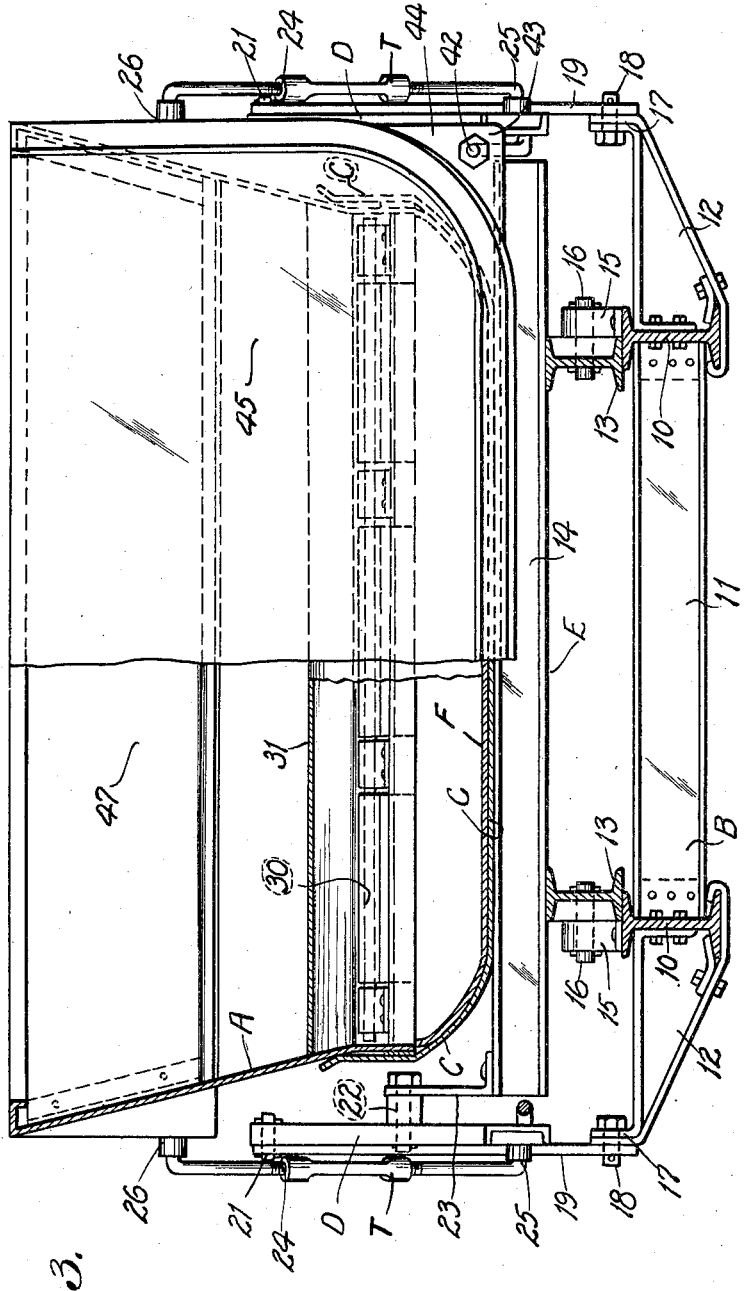

Patented June 17, 1930

1,765,232

UNITED STATES PATENT OFFICE

CHRISTIAN J. HUG, OF HIGHLAND, ILLINOIS

TRUCK BODY

Application filed June 6, 1929. Serial No. 368,760.

My invention relates to improvements in truck bodies and has for its particular object to provide a truck body especially adapted to the hauling and dumping of viscous materials.

The body of my invention is arranged to receive its load at its open top and to discharge the same through a series of successively-opening trap doors forming its bottom; and the charge thus unloaded through the bottom being caught in a trough which serves to hold the body when said body is being loaded or carried and which is tilted to form a delivery chute during the process of unloading.

Other incidents of my invention will be apparent from the following description.

Drawings

Fig. 3 is a rear elevation of the same.

Description

Figure 1:
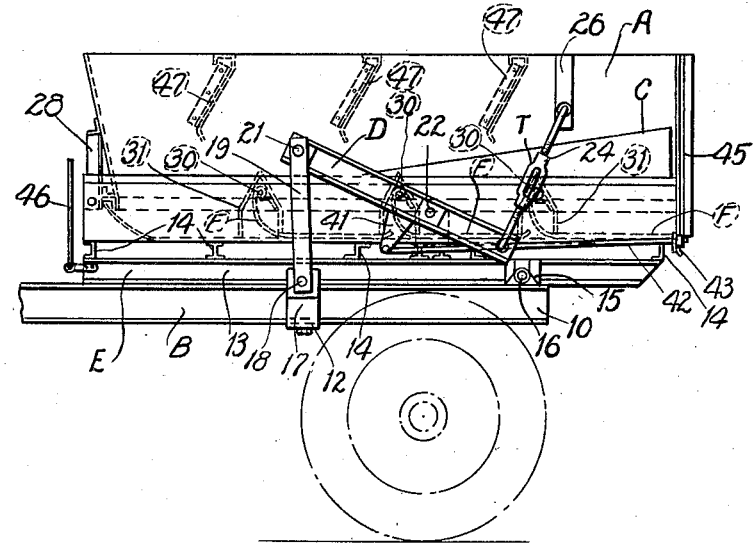
Fig. 1 is a side elevation of a truck body embodying my invention, in position for loading and carrying.

As shown in the drawings, the body A is carried by the chassis frame B, the frame B comprising side sills 10—10 braced by transverse I-beams 11 and carrying side brackets 12—12. The trough C is supported by a tilting frame E, composed of the longitudinal I-beams 13—13 and cross beams 14, the beams 13—13 being pivotally attached to the rear end of the chassis B by means of the brackets 15—15 and pins 16—16.

Bearing braces 17 are secured to the outer ends of the brackets 12—12 by bolts 18 and the lower terminals of the lever-arms 19—19 are secured to said plates 17—17 by said bolts 18. At their upper ends the lever-arms 19—19 are pivotally connected by means of pins 21—21 with the forward terminals of the lever-arms D—D which are mounted by means of stub-shafts 22—22 to the standards 23—23 which are mounted at the outer terminals of one of the transverse beams 14. At their rear ends, the lever-arms D—D are pivoted to links 24—24 by means of pins 25—25; the links 24—24 in turn being pivotally attached to plates 26—26, which plates 26—26 are mounted upon the side walls of the truck body A as shown. The bottom of the truck body A is contoured as shown to fit within the upturned outer flanges of the trough C, the front end of the truck body A having sliding contact with the trough C by means of the guide 28. The bottom of the body A consists of a series of trap doors F, each hingedly mounted by means of a transverse pintle 30, each hinge so formed being located within a housing 31, triangular in transverse section as shown, said housing 31 serving to keep the viscous content of the body A in partially divided batches within said body A. The trap doors F are kept closed by contact with the bottom of the trough C when the body A is in loading or carrying position as shown in Figs. 1 and 3.

The links 24—24 are each made extensible by means of a turnbuckle T thus adjusting the length of the link 24 to control the length of upward throw of the rear end of the body A.

When the parts are in such relative position (namely, that illustrated in Figs. 1 and 3), the lever mechanism which includes the lever-arm D serves to hold the body A, chassis frame B and trough C securely together.

In the handling of certain materials of the class for whose transportation the truck body of my invention is intended, there will at times during transportation, and before arrival at the place of discharge of the load, be a settling of the heavier material to the bottom with the result of leaving a relatively liquid mass at the top of the load. In order to prevent the rearward slopping of such liquid matter during the operation of discharge, I have provided the body A with a series of transverse baffle plates 47 mounted as shown, said baffle plates 47 serving to prevent the rearward discharge of the material between them, and to direct the discharge of such material downwardly through the registering trap doors E.

Depending from the central portion of the lever-arm D is the finger 41 to the bottom of which is pivoted the rod 42 extending rearwardly through a slot 43 in a plate 44, which plates 44 are mounted at the lower outer corners of the tail-gate 45, which tail-gate 45 closes the rear end of the body A.

Figure 2:
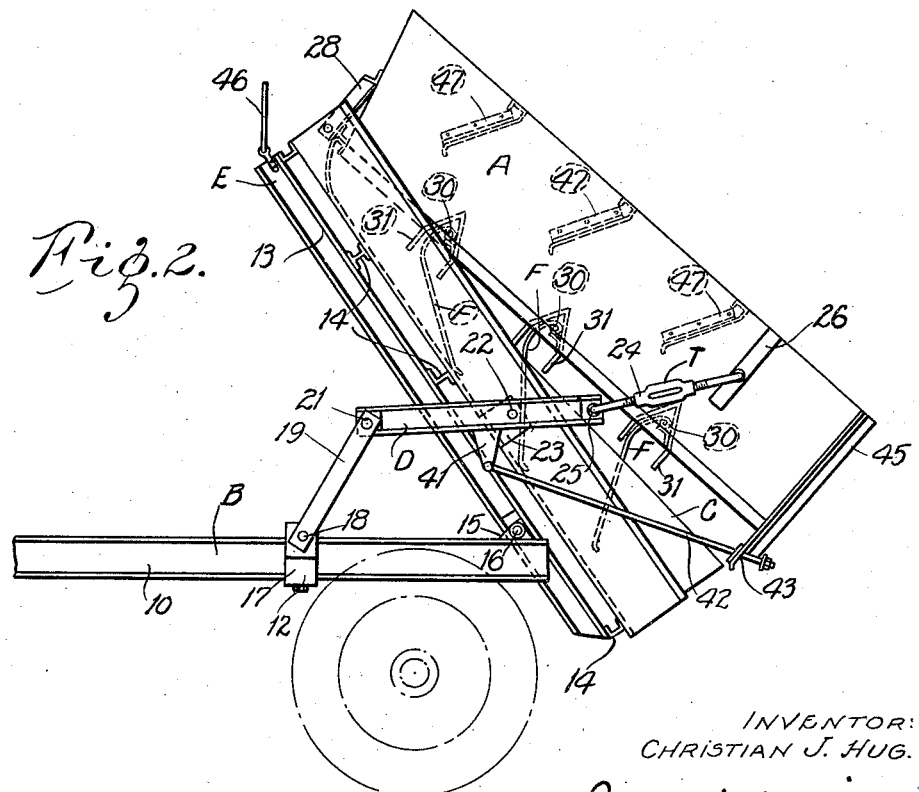
Fig. 2 is a like view of the same in unloading position.

To the frame E the lifting cord 46 is subjected to an upward pull by any desired and appropriate mechanism (not shown) to tilt the body A to the position shown in Fig. 2 and discharge its contents.

*Mode of operation*

The body A having been loaded and transported to the desired point of deposit, the cord 46 is pulled upwardly to tilt the body A from the position illustrated in Fig. 1 to the position illustrated in Fig. 2. During this operation the body A and trough C are forced to gradually diverge, and the trap doors E are successively opened from the rear to the front of the body A so that the last of the series of trap doors E, hinged at the front end of the body A, will have its lower edge in contact with the bottom of the trough C, as shown in Fig. 2. During this operation the body A gradually assumes a tilted position, as shown in Fig. 2.

The load being dumped, the pull on the cord 46 is released, permitting the parts to resume their contact and locked relationship illustrated in Fig. 1. The lower edges of the trap doors E are preferably slightly turned rearwardly as indicated by 47 to facilitate their re-seating in place within the bottom of the trough C.

Many variations of structure may be made without departure from my actual invention as defined by the appended claims.

Claims:

1. A device of the class described comprising a truck body; a bottom for said body composed of a series of trap doors; a trough wherein said body normally rests; a chassis frame whereon said trough is hingedly mounted; and means for elevating the forward end of said trough to discharge the contents of said body; in combination with a lever mechanism arranged to control the relative positions of said body, trough and chassis frame when in loading position, and when unloading.

2. A device of the class described comprising a truck body; a bottom for said body composed of a series of trap doors; a trough wherein said body normally rests; a chassis frame whereon said trough is hingedly mounted; and means for elevating the forward end of said trough to discharge the contents of said body; in combination with a lever mechanism arranged to control the relative positions of said body, trough and chassis frame when in loading position and when unloading; said lever mechanism including an extensible link to vary the throw of the body when unloading.

In testimony whereof I have hereunto affixed my signature.

CHRISTIAN J. HUG.